United States Patent [19]

Matsumoto et al.

[11] Patent Number: 4,710,618

[45] Date of Patent: Dec. 1, 1987

[54] AIRBORNE TRACKING SUNPHOTOMETER APPARATUS AND SYSTEM

[75] Inventors: Yutaka Matsumoto, San Jose; Cesar Mina, Santa Clara; Philip B. Russell, Los Altos; William B. van Ark, Sunnyvale, all of Calif.

[73] Assignee: The United States of America as represented by the Administrator of the National Aeronautics and Space Administration, Washington, D.C.

[21] Appl. No.: 823,712

[22] Filed: Jan. 29, 1986

[51] Int. Cl.$^4$ ............................................. G01J 1/20
[52] U.S. Cl. .................................. 250/203 R; 126/425
[58] Field of Search ................... 250/203, 234, 237 R; 126/425; 356/141, 152, 225, 219, 220, 222

[56] References Cited

U.S. PATENT DOCUMENTS

| | | | |
|---|---|---|---|
| 3,670,168 | 6/1972 | Low et al. | 356/141 |
| 3,951,550 | 4/1976 | Slick | 356/152 |
| 3,996,460 | 12/1976 | Smith | 356/152 |
| 4,018,532 | 4/1977 | Fletcher et al. | 250/203 |
| 4,181,435 | 1/1980 | Williamson et al. | 356/141 |
| 4,297,572 | 10/1981 | Carlton | 126/425 |
| 4,315,690 | 2/1982 | Trocellier et al. | 250/203 |
| 4,355,896 | 10/1982 | Laue | 356/222 |
| 4,424,801 | 1/1984 | Mori | 126/425 |
| 4,447,718 | 5/1984 | Mori | 250/203 |
| 4,484,565 | 11/1984 | Mori | 126/425 |

*Primary Examiner*—David C. Nelms
*Attorney, Agent, or Firm*—Darrell G. Brekke; John R. Manning; Robert D. Marchant

[57] ABSTRACT

An airborne tracking sun photometer apparatus has a rotatable dome (14). An azimuth drive motor (32) is connected to rotate the dome (14). The dome (14) has an equatorial slot (36). A cylindrical housing (38) is pivotally mounted inside the dome (14) at the equatorial slot (36). A photometer (22) is mounted in the housing (38) to move in the equatorial slot (36) as the housing (38) pivots. The photometer (22) has an end facing outward from the slot (36) with an optical flat transparent window (62). An elevation drive motor (40) is connected to pivot the cylindrical housing (38). The rotatable dome (14) is mounted in bulkhead (18) of an aircraft to extend from the interior (16) of the aircraft. A sun sensor (50) causes the photometer to track the sun automatically. Alternatively, the photometer may be oriented manually (by voltages (117, 119)) or by computer (20).

15 Claims, 6 Drawing Figures

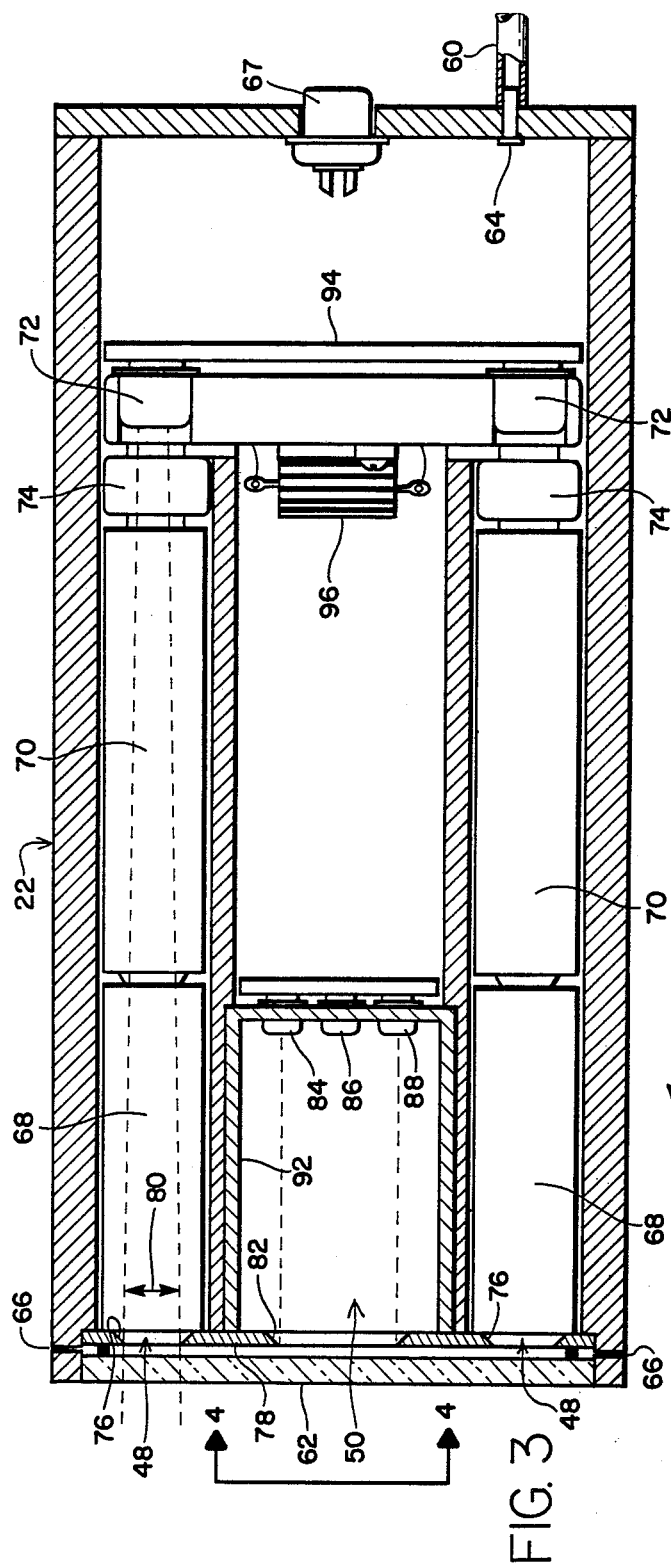

AIRBORNE TRACKING SUNPHOTOMETER APPARATUS AND SYSTEM

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

1. Field of the Invention

This invention pertains to a novel photometer apparatus and system especially adapted for use in an aircraft. More particularly, it relates to such an apparatus and system which does not have to be pointed through a window in the aircraft. Most especially, it relates to such an apparatus and system which will allow observations of the sun to be made during a substantially greater portion of the aircraft flight than with the prior art apparatus and systems.

2. Description of the Prior Art

A variety of apparatus and systems for tracking solar and other light sources are known in the art. For example, such apparatus and systems are disclosed in the following issued U.S. Pat. Nos.: 2,972,812, issued Feb. 28, 1961 to Jackson, Jr.; 2,975,289, issued Mar. 14, 1961 to Robert et al.; 4,173,414, issued Nov. 6, 1979 to Vauchy et al.; 4,329,579, issued May 11, 1982 to Jansen et al.; 4,332,238, issued June 1, 1982 to Garcia, Jr.; 4,367,403, issued Jan. 4, 1983 to Miller; 4,440,150, issued Apr. 3, 1984 to Kaehler and 4,445,030, issued Apr. 24, 1984 to Carlton. However, none of the apparatus and systems disclosed in these patents is particularly adapted for use in an aircraft.

A variety of sensors for determining the position of the sun or other light sources are also known in the art. For example, such sensors are disclosed in the following issued U.S. Pat. Nos.: 3,670,168, issued June 13, 1972 to Low et al.; 3,951,550, issued April 20, 1976 to Slick; 4,181,435 issued Jan. 1, 1980 to Williamson et al.; 4,315,690, issued Feb. 16, 1982 to Trocellier et al.; 4,424,801, issued Jan. 10, 1984 to Mori and 4,484,565, issued Nov. 27, 1984 to Mori. However, none of these sensors are incorporated into an apparatus or system particularly adapted for use in an aircraft.

While the art relating to such apparatus, systems and sensors is a well developed one, the approach that has hitherto been employed is to use apparatus and systems for tracking and sensors for determining light source position that are not especially designed for aircraft use by pointing the apparatus, systems and sensors through a cabin window of the aircraft. When used for solar measurements, this approach requires that the aircraft be maneuvered to keep the apparatus pointed at the sun through the window. Such apparatus and systems also require that the window be removed from the aircraft before and after each flight for calibration purposes. Obviously, such removal is both troublesome and undesirable with respect to the structural integrity of the aircraft.

SUMMARY OF THE INVENTION

Accordingly, it is an object of this invention to provide a photometer apparatus especially designed for use in an aircraft and aircraft system including the photometer apparatus which does not require that the apparatus be pointed through a window of the aircraft.

It is another object of the invention to provide such an apparatus and system which does not require disruption of the aircraft structural integrity to use the apparatus and system.

It is a further object of the invention to provide such an apparatus and system in which the apparatus and system may be used for its intended measurements for a much greater portion of an aircraft flight than possible with prior art apparatus and systems.

It is still another object of the invention to provide such an apparatus and system including a sensor for locating the sun or other light source which is compact in size and simple in operation.

The attainment of these and related objects may be achieved through use of the novel photometer apparatus, system and sensor herein disclosed. A photometer system apparatus in accordance with this invention includes a rotatable dome. A first drive means is connected to rotate the rotatable dome. The rotatable dome has an equatorial slot. A cylindrical housing is pivotally mounted inside the dome at the equatorial slot. A photometer is mounted in the cylindrical housing to move in the equatorial slot as the cylindrical housing pivots. The photometer has an end facing outward from the slot. An optical flat transparent window is mounted over the outward facing end of the photometer. A second drive means is connected to pivot the cylindrical housing to move the photometer in the slot of the rotatable dome.

In the system of this invention, this apparatus is mounted in an aircraft with the rotatable dome extending from an interior of the aircraft through a bulkhead of the aircraft. An optical position sensor used in the apparatus and system of the invention has a tube with an end facing the optical flat transparent window and an opposing end. The optical flat facing end of the tube has a rectangular opening. There are four photodetectors at the opposing end of the tube. The four photodetectors are positioned such that each side of the rectangular opening bisects one of the photodetectors as viewed from the rectangular opening. The optical sensor is connected to control operation of the first and second drive means in the apparatus and system.

The photometer apparatus of this invention remains permanently in place on the aircraft, and the structural integrity of the aircraft need not be disturbed to calibrate the apparatus. Since the dome and cylindrical housing are movable to track the sun or other light source, the aircraft need not be oriented in a particular fashion to point the photodetector at the sun or other light source. Most of a flight may therefore be used to make measurements with the apparatus.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is a perspective view of a system in accordance with the invention.

FIG. 3 is a cross section view of a portion of the apparatus shown in FIG. 2.

FIG. 4 is an end view of a portion of the apparatus shown in FIGS. 2 and 3, taken along the line 4—4 in FIG. 3.

DETAILED DESCRIPTION OF THE INVENTION

Figure 2:
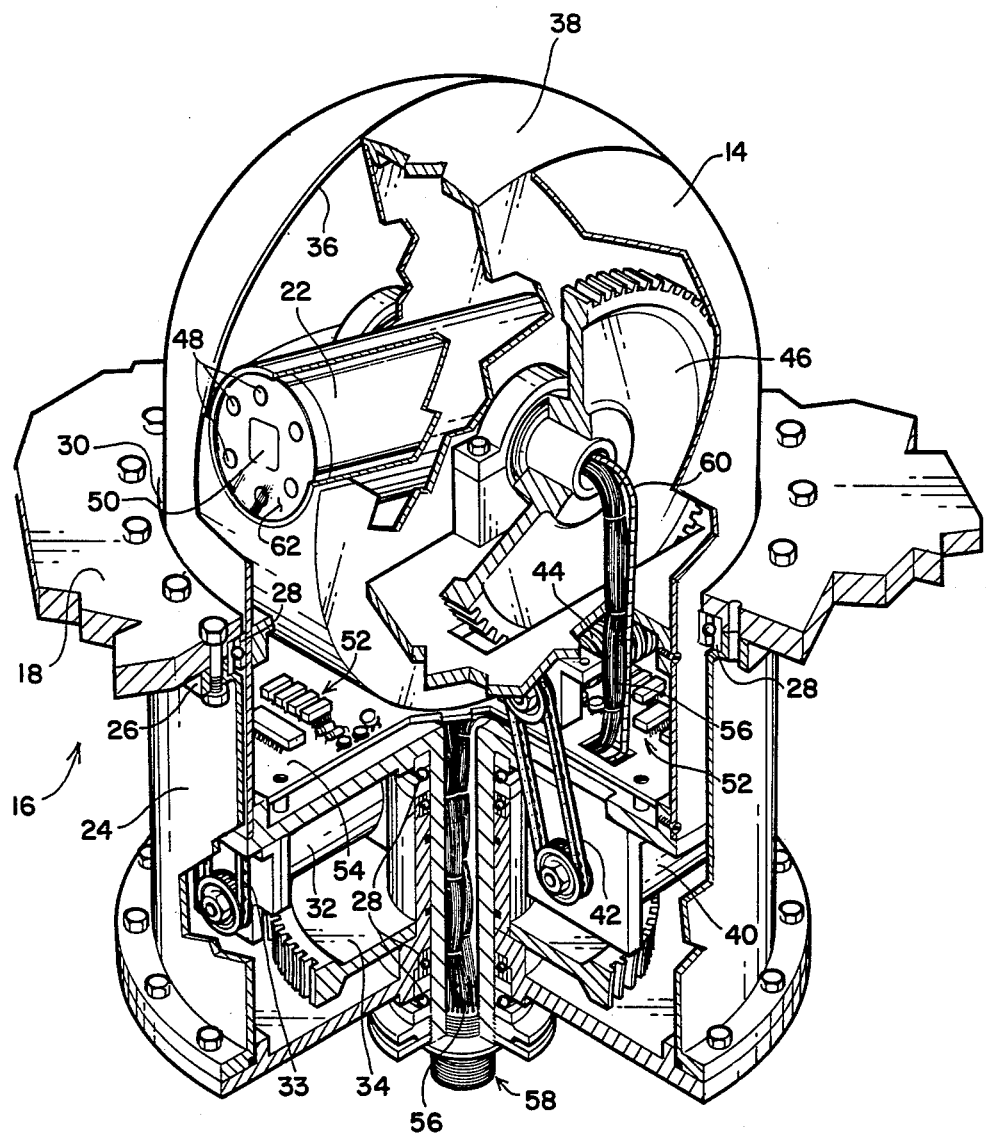
FIG. 2 is a perspective view of an apparatus in accordance with the invention, with partial cutaways to show detail.

Turning now to the drawings, more particularly to FIG. 1, there is shown an aircraft sunphotometer system 10 in accordance with the invention. Aircraft 12 has a rotatable dome 14 extending from interior 16 of the aircraft 12 through bulkhead 18. A data processing system 20 is connected to control operation of the rotatable dome and a photometer 22 (see also FIG. 2) mounted in the dome 14, and to provide data collection and data processing capability in the system 10.

Details of the dome 14 are provided in FIG. 2. A housing 24 is mounted by means of flange 26 to bulkhead 18 from interior 16 of the aircraft 12. Housing 24, in conjunction with hermetic connector 58, provides a hermetic seal between the cabin interior and the outside atmosphere. The dome 14 is rotatably mounted in the housing 24 by means of bearings 28 and extends through circular opening 30 in the bulkhead 18. Azimuth drive motor 32 is connected to rotate the dome 14 by means of belt drive 33 and gear 34.

Dome 14 has an equatorial slot 36. A cylindrical housing 38 is pivotally mounted in the equatorial slot 36. An elevation drive motor 40 is connected to pivot the housing 38 by means of belt drive 42, worm gear 44 and gear 46. The photometer 22 is fixedly attached to the cylindrical housing, so that it will move with the housing 38 as the housing pivots. The photometer 22 has six photometer channels 48 and a sun tracker sensor 50. Interface and drive circuits 52 on board 54 are connected to supply data signals from the photometer 22 to the data processing system 20 and drive signals to control operation of the azimuth drive motor 32 and the elevation drive motor 40 on cables 56. The cables 56 pass through a hermetic sealed connector 58 to the data processing system 20. A nitrogen gas line 60 provides a dry gas atmosphere to the photometer 22.

Further details of the photometer 22 are shown in FIGS. 3 and 4. The photometer 22 has an optical flat 62 on its outward facing end that is exposed to the air stream (see also FIG. 2). The optical flat 62 is exposed to temperatures outside the aircraft 12 as low as −60° C. Nitrogen from gas line 60 is provided at inlet 64, circulated through the photometer 22 and allowed to leave via exits 66 to remove moisture for preventing condensation on the optical flat 62. Connector 67 attaches the cables 56 to the photometer 22.

Each of the photometer channels 48 (see FIG. 3) has elongated tubes 68 and 70 for directing light to detectors 72. Optical filters 74 are provided in front of the detectors 72, in order to provide light of predetermined wave lengths to the detectors 72. Apertures 76 in plate 78 provide a two degree field of vision 80 for the photodetector channels 48.

The sun tracker sensor 50 provides signals indicating the position of the sun with respect to the photodetector 22, so that the dome 14 may be rotated and the housing 38 may be pivoted to point the photodetector channels 48 at the sun. As is best shown in FIG. 4, square aperture 82 in plate 78 is dimensioned and positoned with respect to sensors 84, 86, 88 and 90 so that each side of the square aperture 82 intersects one of the sensors 84–90 at its midpoint. This means that the sensors 84–90 provide 50 percent of their maximum output when the sun tracker sensor is directly aligned with the sun. The error signal from the sun tracker sensor therefore increases linearly with displacement of the sun relative to the directly aligned position. When the detectors are not partially occluded in this manner, the error signal increases abruptly, and the result is a tendency for the system to oscillate near the null position. The sensors 84–90 are positioned at the other end of cylinder 92 from the aperture 82. The sensors 84–90 can be either photovoltaic cells or photoresistor cells.

In operation, when the sensor 50 is pointed directly at the sun, output signals from the four sensors 84–90 are equal. When the sun is positioned other than directly in front of the sun tracker sensor 50, the sensors 84–90 produce unbalanced output signals. The sun tracker sensor 50 is employed in a feedback loop to control operation of the azimuth drive motor 32 and the elevation drive motor 40 to position the sun tracker sensor 50 so that it is pointed directly at the sun, thus also pointing the photometer channels 48 directly at the sun.

The dome 14 and the cylindrical housing 38 are preferably fabricated from molded fiberglass. The fiberglass affords some insulation for the photometer 22. Heaters 126 (FIG. 5b) are installed within the dome 14 to maintain the interior temperature at a constant 45 degrees C. (113 degrees F.). The photometer detectors 72 and circuits on printed circuit board 94 (FIG. 3) are temperature dependent, so their temperature must be kept constant to provide accurate output signals. A resistance heater 96 is therefore provided within the photometer 22 adjacent to the detectors 72. The dome 14, cylindrical housing 38 and optical flat 62 are closely fitted so as to minimize air gaps and present a streamlined protrusion through the fuselage.

Figure 5A:
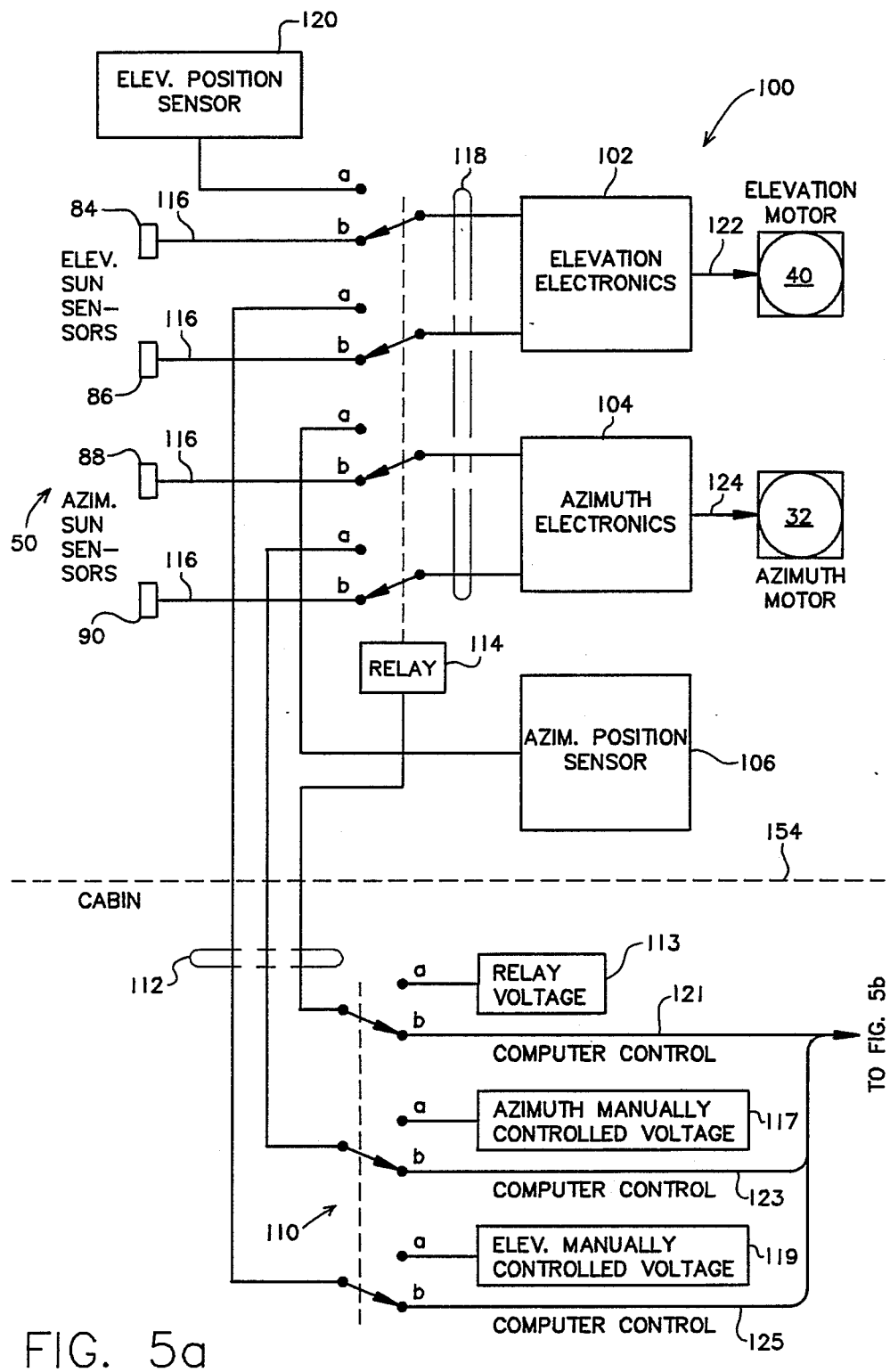
FIGS. 5a and 5b are a block diagram of a system in accordance with the invention.
Figure 5B:
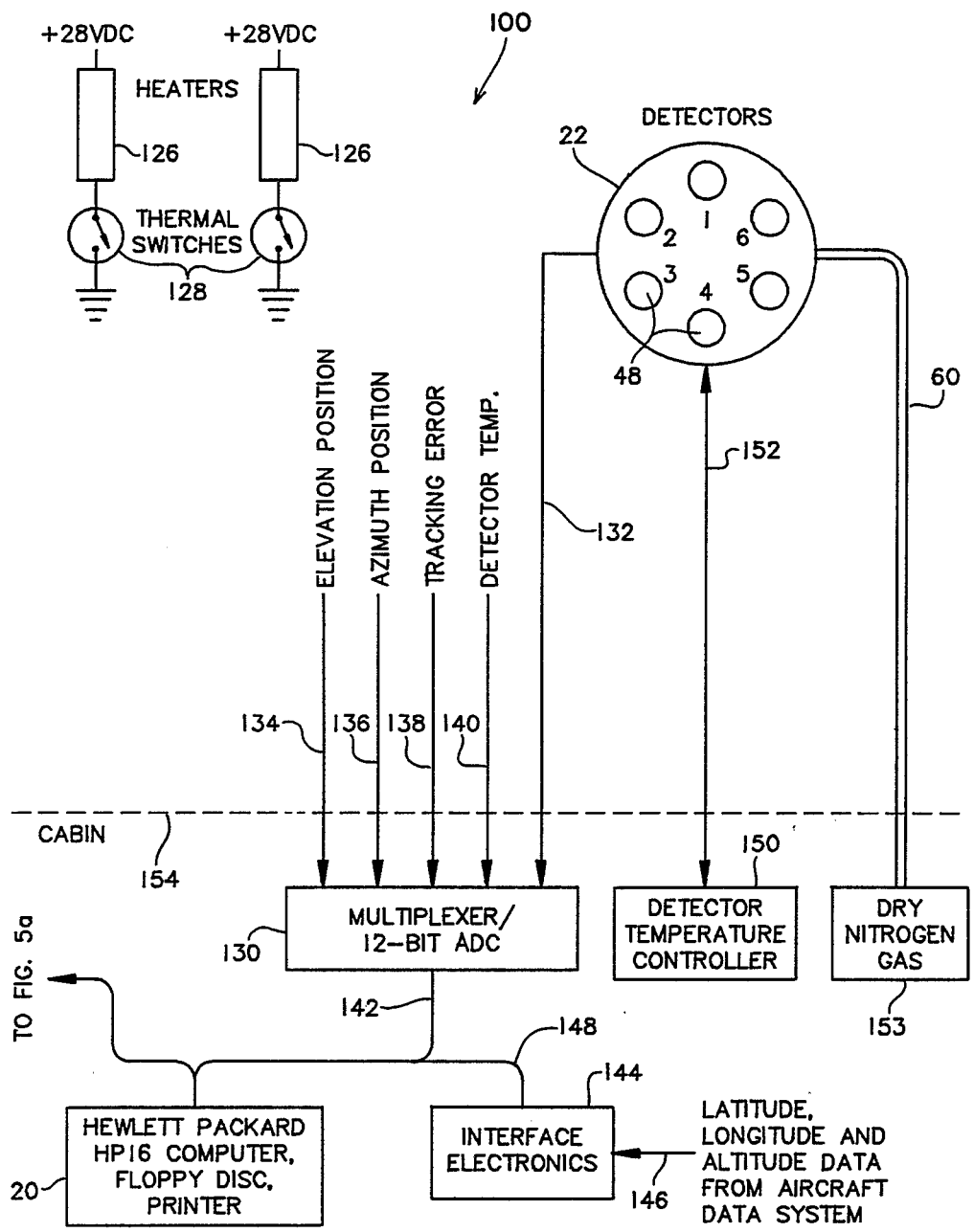

FIGS. 5a and 5b show electronics 100 for the system 10 of FIGS. 1–4. Computer 20 is implemented as a Hewlett Packard HP16 system and is connected to multiplexer/ADC 130 by line 142, interface electronics 144 by line 148, and elevation electronics 102 and azimuth electronics 104 by lines 112, 118, 123–125, switch 110 and relay 114. The sun tracker sensor 50 comprising sensors 84, 86, 88 and 90 is also connected to the elevation electronics 102 and azimuth electronics 104 by relay 114, lines 116 and lines 118. Relay 114 may also be used to connect elevation electronics 102 and azimuth electronics 104 to elevation position sensor 120 and azimuth position sensor 106, respectively. Elevation position sensor 120 is preferably a potentiometer whose wiper is mechanically coupled to housing 38 and produces a voltage representing the elevational angle of photometer 22. Azimuth position sensor 106 is preferably a synchro that is mechanically coupled to dome 14 and generates a voltage representing the azimuth position of photometer 22. Actuating signals to drive elevation motor 40 are carried from elevation electronics 102 by line 122, and actuating signals to drive azimuth motor 32 are transmitted from azimuth electronics 104 by line 124.

Relay 114 is a four-pole-double-throw switch. The switch contacts are in the "b" position when the relay is not energized. When the switch contacts are in the "b" position, elevation motor 40 hunts until the optical axis of sensor 50 is elevationally aligned with the sun and the signals from sensors 84 and 86 are equal. Likewise, when the switch contacts are in the "b" position, azimuth motor 32 hunts until the optical axis of photometer 22 is aligned in azimuth with the sun and the signals from azimuth sensors 88 and 90 are equal.

Switch 110 is configured as a triple-pole-double-throw switch. The photometer 22 may be operated in three different modes. In the first mode the orientation of the photometer is controlled by sun sensor 50 (when relay 114 is in the "b" position). In the second mode the photometer is manually oriented and in the third mode the photometer is directed by computer 20. When switch 110 is thrown in position "a", relay 114 is energized by relay voltage 113 and the relay contacts are thrown to position "a". With this switch 110/relay 114 arrangement the orientation of photometer 22 is controlled by azimuth manually controlled voltage 117 and elevation manually controlled voltage 119. Elevation motor 40 hunts until the voltage from position sensor 120 is the same as manually-set elevation voltage 119, and azimuth motor 32 hunts until the voltage from position sensor 106 is the same as manually-set azimuth voltage 117. Thus, every time that voltage 117 is altered, as with a potentiometer, for example, the azimuth orientation of photometer 22 is altered. The elevational orientation of the photometer is likewise changed when voltage 119 is altered.

When switch 110 is thrown to the "b" position and a relay actuation voltage is sent along line 121 from computer 20, relay 114 is energized and the relay switch contacts are placed in the "a" position. Thereafter, azimuth and elevation voltages generated by computer 20, and routed on lines 123 and 125, respectively, control the orientation of photometer 22. Computer control of the photometer allows artificial tracking of the sun's position even when the sun is temporarily obscured by a cloud.

A record of the photometer signals and other parameters (elevation position, azimuth position, tracking error, and detector temperature, etc.) are kept on the floppy disk of the computer system 20. The analog signals from the detector channels 48 of photometer 22 are routed to a multiplexer (MUX) and a 12-bit analog-to-digital converter (ADC) 130 on line 132. Analog signals representative of elevation position, azimuth position, tracking error and detector temperature are fed into the MUX/ADC by lines 134, 136, 138, and 140, respectively. The output of the MUX/ADC is channeled to the computer system 20 by line 142. The tracking error (of sensor 50) and the detector temperature are recorded to verify proper system operation.

Interface electronics 144 receives latitude, longitude and altitude data in digital format from a navigation system of the aircraft 12 on line 146. The data is fed to computer system 20 for recording along with the other mentioned data.

Electric heaters 126 situated within dome 14 are connected between a 28-volt source and ground by means of thermal switches 128 that close when the temperature inside the dome drops below a predetermined value. The heaters may be, for example, the etched foil "blanket" type sold under the trademark Thermofoil by Minco Products, Inc., 7300 Commerce Lane, Minneapolis, Minnesota 55432. Detector temperature controller 150 is coupled to the resistance heater 96 in photometer 22 by line 152 and regulates the internal temperature of the photometer. Dry nitrogen gas is continuously circulated through the photometer 22 to prevent condensation of moisture. Dry nitrogen gas from source 153 is conveyed to photometer 22 by means of gas line 60.

The circuit elements below broken line 154 in FIGS. 5a and 5b are situated in the interior 16 of the aircraft. The remaining circuit elements above line 154 are provided inside the dome 14 and the cylindrical housing 38 (FIG. 2).

It should now be readily apparent to those skilled in the art that a novel photometer apparatus and system capable of achieving the stated objects of the invention has been provided. The photometer apparatus of this invention need not be pointed through a window of the aircraft. Once the photometer apparatus is installed on an aircraft, no disruption of the aircraft's structural integrity is required to use the apparatus and system. Because the photometer apparatus can track the sun at any position in the sky as high as 80 degrees above the horizon, the apparatus and system may be used to make measurements during a much greater portion of an aircraft flight than possible with prior systems pointed through a window of the aircraft. The sun tracker sensor employed in the apparatus of this invention is small in size and simple in operation.

It should further be apparent to those skilled in the art that various changes in form and details of the invention as shown and described may be made. It is intended that such changes be included within the spirit and scope of the claims appended hereto.

What is claimed is:

1. An airborne tracking sunphotometer system, which comprises an aircraft having an interior and a bulkhead, a rotatable dome extending from the interior through the bulkhead, a first drive means connected to rotate said rotatable dome, said rotatable dome having an equatorial slot above said bulkhead, a cylindrical housing pivotally mounted inside said dome with a portion of the outer surface of said cylindrical housing substantially filling said equatorial slot, a photometer mounted in said cylindrical housing to move in the equatorial slot as said cylindrical housing pivots, said photometer having an end facing outward from the slot, an optical flat transparent window mounted over the outward facing end of said photometer, said cylindrical housing being coupled to said rotatable dome whereby the cylindrical housing and photometer are rotated when the dome is rotated, and a second drive means connected to pivot said cylindrical housing to move said photometer in the slot of said rotatable dome.

2. The airborne tracking sunphotometer system of claim 1 additionally comprising an optical position sensor positioned at the outward facing end of said photometer.

3. The airborne tracking sunphotometer system of claim 2 in which said optical position sensor comprises a tube having an end facing said optical flat transparent window and an opposing end, the optical flat facing end having a rectangular opening, four photodetectors at the opposing end of the tube, the four photodetectors being positioned such that each side of the rectangular opening bisects one of the photodetectors viewed from the rectangular opening, said optical position sensor being connected to control operation of said first and second drive means.

4. The airborne tracking sunphotometer system of claim 3 additionally comprising a heating means positioned to heat at least said cylindrical housing.

5. The airborne tracking sunphotometer system of claim 4 additionally comprising a source of an inert gas connected to supply the inert gas to said photometer.

6. The airborne tracking sunphotometer system of claim 1 additionally comprising a data processing system connected to receive input signals from said photodetectors and to supply control signals for said first and second drive means.

7. The airborne tracking sunphotometer system of claim 2 wherein said photometer has a plurality of channels, each channel comprises a tubular passage, an optical filter and a detector, one end of said tubular passage is adjacent said optical flat transparent window, said optical filter is adjacent said other end of said tubular passage and in front of said detector, and said channels are arranged around said optical position sensor.

8. The airborne tracking sunphotometer system of claim 6 wherein a first sensor generates a signal representative of the azimuth position of said photometer, a second sensor generates a signal representative of the elevation position of said photometer, said photometer generates a plurality of signals representing different wavelengths of received radiation, and said data processing system records all of said signals.

9. A photometer system apparatus which comprises a rotatable dome, a first drive means connected to rotate said rotatable dome, said rotatable dome having an equatorial slot, a cylindrical housing pivotally mounted inside said dome with a portion of the outer surface of said cylindrical housing substantially filling said equatorial slot, a photometer mounted in said cylindrical housing to move in the equatorial slot as said cylindrical housing pivots, said photometer having an end facing outward from the slot, an optical flat transparent window mounted over the outward facing end of said photometer, said cylindrical housing being coupled to said rotatable dome whereby the cylindrical housing and photometer are rotated when the dome is rotated, and a second drive means connected to pivot said cylindrical housing to move said photometer in the slot of said rotatable dome.

10. The photometer apparatus of claim 9 additionally comprising an optical position sensor positioned at the outward facing end of said photometer.

11. The photometer apparatus of claim 10 in which said optical position sensor comprises a tube having an end facing said optical flat transparent window and an opposing end, the optical flat facing end having a rectangular opening, four photodetectors at the opposing end of the tube, the four photodetectors being positioned such that each side of the rectangular opening bisects one of the photodetectors viewed from the rectangular opening, said optical position sensor being connected to control operation of said first and second drive means.

12. The photometer apparatus of claim 11 additionally comprising a heating means positioned to heat at least said cylindrical housing.

13. The photometer apparatus of claim 12 additionally comprising a source of an inert gas connected to supply the inert gas to said photometer.

14. The photometer apparatus of claim 9 additionally comprising a data processing system connected to receive input signals from said photodetectors and to supply control signals for said first and second drive means.

15. The airborne tracking sunphotometer system of claim 10 wherein said photometer has a plurality of channels, each channel comprises a tubular passage, an optical filter and a detector, one end of said tubular passage is adjacent said optical flat transparent window, said optical filter is adjacent said other end of said tubular passage and in front of said detector, and said channels are arranged around said optical position sensor.

* * * * *